Dec. 29, 1964 A. H. BOBECK 3,163,855

MAGNETIC MEMORY CIRCUITS

Filed Dec. 10, 1959 4 Sheets-Sheet 1

INVENTOR
A. H. BOBECK
BY William H. Kamstra
ATTORNEY

Dec. 29, 1964 A. H. BOBECK 3,163,855

MAGNETIC MEMORY CIRCUITS

Filed Dec. 10, 1959 4 Sheets-Sheet 2

INVENTOR
A. H. BOBECK
BY
William H. Kamstra
ATTORNEY

INVENTOR
A. H. BOBECK
BY
William H. Kamstra
ATTORNEY

Dec. 29, 1964 A. H. BOBECK 3,163,855

MAGNETIC MEMORY CIRCUITS

Filed Dec. 10, 1959 4 Sheets-Sheet 4

INVENTOR
A. H. BOBECK
BY William H. Kamstra
ATTORNEY

United States Patent Office 3,163,855

Patented Dec. 29, 1964

3,163,855

MAGNETIC MEMORY CIRCUITS

Andrew H. Bobeck, Chatham, N.J., assignor to Bell Telephone Laboratories, Incorporated, New York, N.Y., a corporation of New York Filed Dec. 10, 1959, Ser. No. 858,636
27 Claims. (Cl. 340—174)

This invention relates to information handling systems, and more particularly to coordinate magnetic memory arrays adapted for use in such systems.

Magnetic memory circuits in which specific information bits are stored in a coordinate array of magnetic elements such as toroidal magnetic cores, multi-apertured magnetic elements, and the like, are well known in the information handling art. Another magnetic element which has proven highly advantageous for the multiple storage of information bits is the magnetic wire memory element having a helical flux component associated therewith. Such a memory element and an illustrative memory array comprised thereof is described, for example, in the copending application of the present inventor, Serial No. 675,522, filed August 1, 1957, and now U.S. Patent No. 3,083,353. In magnetic memory arrangements generally an information bit is stored in an information address in the form of a representative condition of remanent magnetization of the storage element assigned as the address. The substantially rectangular hysteresis properties of the magnetic materials employed in the fabrication of the memory elements makes such remanent magnetization possible, as is also well known. In a magnetic wire memory element of the character referred to hereinbefore discrete information addresses are measured off at segments of its length by energizing solenoids inductively coupled thereto at predetermined intervals. An information bit is then stored in an address by a particular representative remanent magnetization in the helical magnetic component within the wire segment.

In each of the foregoing arrangements, the information bits are contemplated as being stored in the information addresses as representative remanent magnetizations. In another information storage arrangement magnetic memory elements in a coordinate array also play an advantageous role, but in this case, rather as a means for interrogating information stored in a particular pattern of individual magnet means. In one such illustrative memory array a particular pattern of permanent magnets is arranged closely adjacent a corresponding coordinate array of magnetic memory elements. The field of each of the permanent magnets is sufficient to magnetically saturate the adjacent corresponding magnetic elements. When an interrogation drive magnetomotive force is now applied to the memory elements having permanent magnets adjacent thereto, the latter memory elements as a result will be unable to respond by flux switching. This result may be detected in the conventional manner by the absence of readout signals on sensing conductors coupled to the memory elements. This absence is conventionally held indicative of stored binary "0's" in the pattern of permanent magnets. Where no permanent magnets appear adjacent the magnetic memory elements, the interrogating drive will be effective to cause a flux switching in the adjacent memorw elements. As a result, and also in the conventional manner, output signals will be induced in coupled sensing conductors, which signals will be indicative of stored binary "1's."

The pattern of permanent magnets may be advantageously affixed to a nonmagnetic card or plate. The points on the plate corresponding to the crosspoints of the associated coordinate array of magnetic elements at which no permanent magnets are affixed are thus representative of binary "1's." An advantageous information storage arrangement is thus achieved in which information, although permanently storable, is readily changed by simply removing the permanent magnet card containing one grouping of information and substituting for it a second card containing another information grouping. Such an information storage arrangement in which toroidal magnetic core elements are employed is described in detail in the copending application of the administratix of the estate of S. M. Shackell, deceased, Serial No. 708,127, filed January 10, 1958.

Although in the illustrative permanent magnet storage arrangement referred to in the immediately foregoing, toroidal cores are advantageously employed as interrogating elements, magnetic wire memory elements may be employed for this purpose with equal facility. By simply substituting a coordinate of toroidal core elements with a single wire memory element, particular address segments of the wire element may be disabled from flux switching during interrogation by adjacently disposed permanent magnets. Thus, the operation in terms of the manner of information storage and interrogation of such a wire memory element arrangement is closely similar to that of an analogous arrangement employing toroidal cores.

In coordinate memory arrays where in formation is stored in the form of patterns of discrete magnetic fields operating upon magnetic memory elements, whether toroidal cores or memory wires, the problem is presented how most advantageously to bring an effective magnetic field into inductive relationship with a switching memory element. In the memory arrangement of S. M. Shackell described generally in the foregoing, one specific illustrative manner of accomplishing the disabling saturation of a memory element is to permanently position a permanent magnet adjacent each and every memory element of the coordinate array. A shielding plate or card of a magnetic material is then inserted between the permanent magnets and the array of the memory elements. The fields of the permanent magnets are, as a result, constrained away from the memory elements which are thus left free to switch upon the application of an interrogating drive magnetomotive force. Each of the memory elements so switched will accordingly induce output signals indicative of binary "1's" in coupled sensing conductors. Where binary "0's" are to be stored, that is, where the memory elements of the coordinate array are to be disabled from switching responsive to an applied interrogating drive, the shielding card is apertured to permit the fields of the permanent magnets full access to the switching memory elements which are to be saturated and hence disabled. In this specific memory arrangement a coordinate array of switching memory elements thus has a corresponding coordinate array of permanent magnets arranged in juxtaposition therewith and the information stored is contained in a pattern of apertures in the shielding card interposed between the magnets and the switching memory elements.

The permanent magnet-apertured card information storage array as briefly described in the foregoing advantageously simplifies the problem of providing changeable information storage cards. Since a corresponding coordinate array of permanent magnets is permanently arranged adjacent the coordinate interrogating array of memory elements, it remains only to selectively aperture an information card in accordance with the information to be stored. This may manifestly be accomplished by means of well-known card punching techniques. Problems such as affixing the permanent magnet means to, and maintaining them on, the information cards are conveniently avoided. However, a complete array of permanent magnets is still required and all of the considerations encountered in properly spacing the magnets from the switching memory elements must be dealt with. Thus, the magnets must be of such a size and spaced in such a manner that the fields presented will be effective to fully saturate a memory element at an information address and yet not be strong enough to interfere with the switching of a memory element at an adjacent information address.

The most advantageous manner of controlling magnetic fields and of rendering such fields most effective are also important considerations in coordinate memory arrays where information values are stored without the use of disabling magnets or other means. Thus, where information is stored in the form of representative remanent magnetic states of address segments alone, factors such as self-inductance of the energizing solenoids, spacing of the circuit elements, and the like, frequently dictate particular apparatus details which can add materially to cost and time of fabrication.

Accordingly, it is an object of this invention to control the application of magnetic fields to address segments of magnetic wire memory arrays.

Another object of the present invention is to accomplish the patterned disabling of particular memory elements in a coordinate memory array in accordance with stored information without the use of permanent magnets or other means for producing disabling fields.

It is another object of this invention to provide a new and improved means for permanently storing information bits in a magnetic memory array.

A further object of this invention is to simplify the construction of a permanent information storage array and at the same time to increase the reliability and performance of the readout circuitry.

Still another object of this invention is to increase the effectiveness of magnetic fields employed to interrogate a permanent information storage array.

Yet another object of this invention is to provide a new and novel coordinate magnetic memory array.

It is also an object of this invention to provide a new and improved magnetic memory array having the advantage of nondestructive readout.

The foregoing and other objects of this invention are realized in one specific illustrative embodiment thereof comprising a plurality of parallelly arranged magnetic wire memory elements. The latter wire elements have helical magnetizable components which may be of a square hysteresis loop material and constitute the Y coordinates of an XY coordinate array. The X coordinates of the array are made up of serially-connected energizing windings which may conveniently be in the form of flat strip solenoids inductively coupled to the Y coordinate wire memory elements. The X coordinate solenoids are arranged in the memory array between the coupled wire elements and an electrically conductive sheet, which sheet comprises the information carrying portion of the memory array. Information is stored in the form of a predetermined pattern of apertures provided in the sheet, which apertures are arranged to coincide with intersections or crosspoints of the X and Y coordinates of the array. The specific memory array being described in general terms is contemplated as being word organized. Thus, corresponding information bits making up the information words stored are aligned along the X coordinate strip solenoids and whatever apertures appear immediately adjacent in the adjoining sheet carrying the stored information are thus also arranged substantially in alignment with the strip solenoids.

In magnetic wire memory arrangements generally, the character of an information bit stored at an information address segment is determined by appyling an interrogating magnetomotive drive to the segment. Should a flux switching occur in the segment, this flux switching will be indicative of the storage in the address segment of one of the binary values. The flux switching may be sensed as a potential difference generated across the ends of the wire element itself. The other binary value is indicated by the failure of the applied interrogating drive to switch the flux of the address segment. This would obviously be the result if the magnetization of the segment representative of the later binary value is already in the direction in which the interrogating drive tends to switch it. The absence of a flux switching is indicated by the absence of an appreciable potential across the ends of the memory wire. Thus, whether or not an address segment of the memory wire responds to an applied magnetomotive force during interrogation is the basis for distinguishing between the two binary values in magnetic wire memory arrays hitherto known. In the present invention, the stored information is similarly manifested. Thus, the character of a stored information bit may be similarly recognized by the ability of the associated wire segment to respond to the interrogating drive.

The magnetic disabling of a segment of the wire memory element of the present invention is accomplished by the conductive sheet positioned on the opposite side of the energizing solenoids from the wire memory elements. It has been found that eddy curents induced by the magnetic field generated by a solenoid in the conductive sheet so placed, in turn generate magnetic fields which act in opposition to the field of the solenoid when an interrogating current pulse is applied thereto. As a result, the latter field will be able to cause fewer lines of force to act on an information address segment of the magnetic wire memory element. Any flux switching from a polarity opposite to that of the applied field will thus be inhibited. An address segment, on the other hand, which has an aperture of the sheet adjacent the solenoid coupled thereto, will not be so inhibited from flux switching. The aperture, which is dimensioned with a view to the number of lines of force required, permits the field generated by the solenoid effectively to act on the associated address segment.

In a magnetic memory array according to the foregoing principles, each of the address segments of the coordinate array are magnetically biased to remanent saturation in one direction. A conductive sheet which may advantageously be in the form of a removable information card, is placed, as above described, in juxtaposition with the solenoids of the memory. The sheet is apertured in accordance with the information to be permanently stored, with each aperture appearing adjacent a corresponding information address of the memory. In order to conform to conventional practice, an aperture is provided in the information card adjacent each information address which is to contain a binary "1." The information addresses which are to contain "0's" will then have adjacent thereto solid portions of the information card. When an interrogating current pulse of appropriate polarity is applied to a word solenoid during a readout stage of operation, flux switching in address segments adjacent apertures in the information card will alone be possible. As a result, potentials generated across the wire memory elements in which the switching segments occur will be indicative of binary "1's" of the interrogated word. Since flux switching is effectively inhibited in the segments having solid portions of conductive sheet adjacent thereto, no appreciable voltages are generated across the wire elements in which the latter segments occur. The absence of output voltage signals is then indicative of binary "0's" of the interrogated word. The apertured information sheet or card is thus effective to selectively shield the information address segments of the coordinate wire memory array. Once a switching has occurred, the continuously applied magnetic bias is effective to restore the switched wire segments to their normal state of remanent magnetization.

Although in the foregoing specific illustrative embodiment the conductive sheet was generally described as limiting the magnetic fields at its solid portions and permitting the fields full switching access to the address segments of the wire memory elements at its apertures, other modes of operation are equally within the scope of this invention. Thus, the field shielding effect of the electrically conductive sheet may advantageously be applied in other memory array assemblies. For example, a direct shielding may be achieved by positioning the sheet between the drive solenoids and the wire memory elements to accomplish the same ultimate end of permitting the fields free switching access to the address segments of the memory elements at the apertures. In still another operative mode, the conductive sheet may be positioned on one side of the wire memory elements and the drive solenoids on the other. In the latter mode the shielding effect of the solid portions of the sheet is to constrain the magnetic fields generated by the solenoid into the address segments of the wire memory elements. The fields are thus made effective to cause a flux switching at the latter segments. Where apertures appear in the sheet adjacent address segments, the fields are dispersed through the apertures with the result that an insufficient number of lines of force are operative on the latter address segments to cause a flux switching. Manifestly, the representative character of solid portions of the sheet and its apertures are reversed with respect to the binary "1's" and "0's." Other specific arrangements and combinations of wire memory elements, conductive sheets, and drive solenoids are also possible within the scope of this invention and will be described in detail hereinafter.

Although apertures in the information card in the foregoing arrangement are effective to accomplish the selective disabling of the coordinate memory address segments, in another specific embodiment of this invention the information card is indented or displaced at each address at which switching of a segment is not to be inhibited. Effective flux shielding at selected addresses is thus also advantageously achieved and, further, a greater information bit density is thus made possible.

According to another aspect of this invention an unapertured, electrically conductive sheet may be employed in cooperation with the energizing solenoids of a variable magnetic wire memory array to render the fields generated by the solenoids during writing or reading operations more effective to accomplish their flux switching functions. The conductive sheet is advantageously employed in the memory arrays where information is stored only as particular remanent magnetic states of address segments of the memory wires. The conductive sheet is arranged in conjunction with the solenoid and with respect to an address segment such that flux induced by an energized solenoid is constrained along the wire segment. Thus, rather than limit the flux in an address segment as was the case in the apertured sheet embodiments of this invention generally described hereinbefore, the conductive sheet is so placed as to serve only a flux constraining or guidance function.

It is thus a feature of this invention that an electrically conductive sheet is positioned in inductive relationship with the energizing solenoids of a magnetic wire memory array. The sheet advantageously functions as an inductive shield to achieve a more effective and concentrated field action on the address segments of the memory wires during the energization of the solenoids.

It is also a feature of this invention that a similar electrically conductive sheet, apertured in accordance with information to be stored, is also positioned adjacent a coordinate array of magnetic wire memory elements. Each of the apertures corresponds to an information address segment of the coordinate array of wire memory elements and the controlled flux shielding effect of the solid portions of the sheet now prevents a flux switching at an address segment during readout. Where an aperture in the sheet permits such a flux switching, a resulting induced output voltage signal is indicative of a particular binary value.

It is another feature of this invention that a coordinate array of magnetic wire memory elements comprises a means for reading out information stored in a pattern of apertures in an electrically conductive sheet.

It is still another feature of this invention that a coordinate array of magnetic wire memory elements comprises a means for reading out information stored in a pattern of indentations in an electrically conductive sheet.

The foregoing and other objects and features of this invention together with the advantages arising therefrom will be better understood from a consideration of the detailed description of illustrative embodiments thereof which follows when taken in conjunction with the accompanying drawing in which.

Figure 1B:
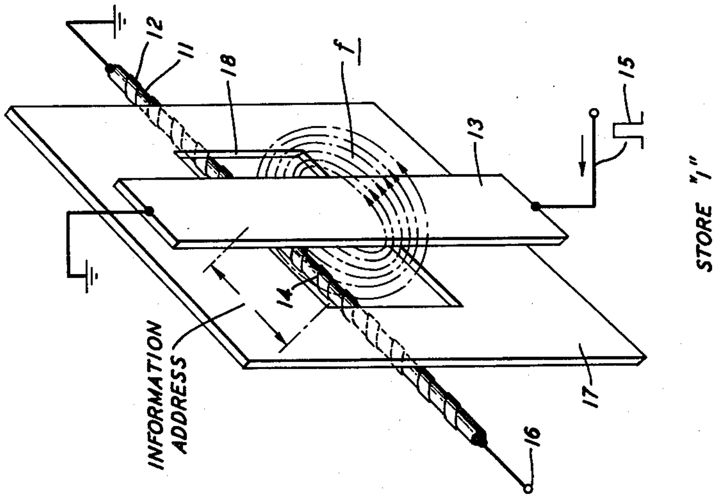
FIGS. 1A and 1B depict in perspective an unapertured and an apertured conductive sheet arrangement, respectively, for performing a shielding function in one mode of operation in an information address of a magnetic memory array according to the principles of this invention.

The principles of this invention together with various modes of its operation may now be described in detail in connection with specific embodiments thereof depicted in the drawing. The embodiments shown in FIGS. 1A and 1B constitute single information bit addresses of a magnetic wire memory of the character also to be described in detail hereinafter. The information bit address is defined as a segment of a magnetic wire memory element 11. It is to be understood that in each and every embodiment to be described herein, the element 11 may comprise any of the illustrative wire elements described in detail in the copending application of the present inventor previously referred to herein or it may comprise other known wire memory elements operating on analogous flux switching principles. For purposes of description the element 11 will be assumed in each illustrative embodiment to be described to comprise an electrical conductor having helically associated therewith a magnetizable tape component 12 which advantageously may have square loop hysteresis characteristics. A winding, which may for convenience take the form of a strip solenoid 13, is positioned transversely to the wire element 11 and is in an inductive relationship therewith. The solenoid 13 is so placed as to define on the wire element 11 a segment 14 which corresponds to an information address on the wire element 11. During the normal operation of a memory arrangement so far described a current pulse 15 is applied to a terminal of the solenoid 13 which may be assumed to be in the direction indicated in FIG. 1A. The resulting magnetic field generated by the solenoid 13, which is suitably spaced from the wire segment 14, normally acts upon the latter segment to cause a switching in a remanent flux in the tape component 12 of the segment 14 as determined by the polarity of the applied field. In accordance with the known principles of operation of such wire memory elements generally, the flux switching, if any, may be detected as a potential difference between the ends of the wire element 11, which difference may be made available as an output signal on a terminal 16 of the wire element 11. The output signal will then be indicative of the information value stored in the information address segment 14 of the element 11.

In accordance with one aspect of the present invention an electrically conductive sheet 17 is interposed between the wire memory element 11 and the solenoid 13. When an energizing current pulse 15 is now applied to the solenoid 13 the generated field, which is designated in FIG. 1A by flux lines *f*, is effectively constrained in the space *d* between the conductive sheet 17 and the solenoid 13. The effective field operative on the address segment 14 during the time of the pulse 15, will, as a result, be of insufficient magnitude to cause a flux switching in the segment 14 should the remanent flux in the latter segment be of a polarity to permit such switching. The shielding against the generated field offered by the conductive sheet 17 is manifestly in accord with the known magnetic theory of such operation in which eddy currents induced in the sheet 17 generate image fields opposing the field generated by the energizing solenoid 13. In a basic arrangement so far described it becomes apparent that if the wire element address segment 14 is permanently remanently flux saturated in one direction, the absence of a conductive sheet 17 at the segment 14 may be held representative of a stored binary "1." If the current pulse 15 is an interrogating pulse, in this case a flux switching will result in the address segment 14 and an output signal on the terminal 16 will indicate the presence of the binary "1" in accordance with conventional practice. The presence of the conductive sheet 17 may, by the same token, be held representative of a binary "0." In the latter case, since the sheet 17 effectively shields the address segment 14 from any flux switching, the absence of an appreciable output signal on the terminal 16 as a result of the interrogating pulse 15 will indicate that a binary "0" is stored, also in accordance with conventional practice. To permit the sheet 17 to carry both of the binary values in the manner above described, the latter sheet is advantageously apertured to provide access to an address segment 14 to the field of the solenoid 13. Such an arrangement is depicted in FIG. 1B.

By providing an aperture 18 in the conductive sheet 17 the field generated by the solenoid 13 during the application of the current pulse 15 is rendered fully effective to cause a flux switching in the address segment 14 of the wire element 11. The magnitude of the current pulse may be adjusted so that a flux switching will just occur at a segment 14 adjacent which an aperture 18 of the sheet 17 appears. A suitable discrimination between the switching ability of the applied field at an aperture 18 and a solid portion of the sheet 17 may thus be advantageously insured. It is apparent at this point that by selectively aperturing a conductive sheet 17 at particular information addresses of a plurality of such addresses on a length of memory wire, binary "1's" and "0's" may be stored in any sequence. Further, the actual storage will take place in the apertured conductive sheet 17 itself, the memory wire element 11 then comprising a means for sensing the presence or absence of an aperture 18 at an interrogated information address.

Figure 2B:
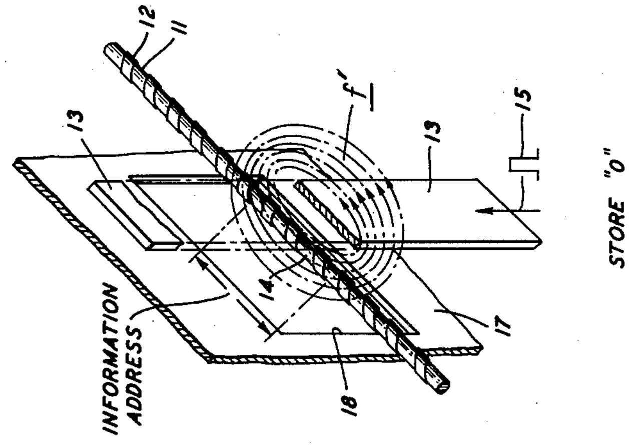
FIG. 2B shows a fragmentary view of the information address of FIG. 2A with the conductive sheet apertured.
Figure 2A:
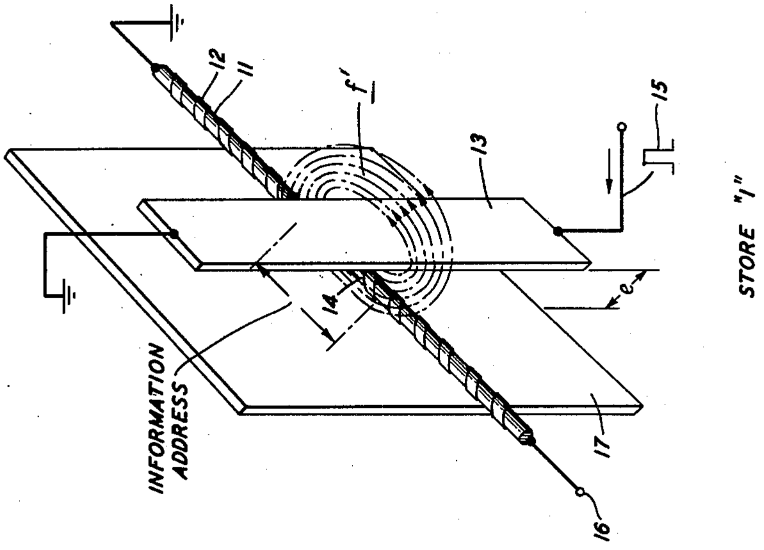
FIG. 2A depicts in perspective a basic information address of a magnetic memory array having a conductive sheet for providing magnetic shielding in a second mode of operation according to the principles of this invention.

Other modes of operation based on the principles of eddy current shielding are also within the scope of this invention. In the specific embodiment of this invention depicted in FIG. 2A, the electrically conductive sheet 17 is employed to render more effective the switching fields generated by the energizing solenoid 13. In this embodiment the conductive sheet 17 is positioned on one side of the magnetic wire memory element 11 while the energizing solenoid is positioned on the other side of the element 11. The latter memory element thus lies in the space *e* between the sheet 17 and the solenoid 13. When an energizing current pulse 15 is applied to the solenoid 13 during an operation of the system of which the embodiment of FIG. 2A may be part, the field generated is constrained by the shielding action of the sheet 17 in the space *e*. As a result, the field is concentrated in the information address segment 14 of the element 11, as depicted by the flattened lines of force *f'* in FIG. 2A. The generated field is thus more effectively and advantageously applied to perform its flux switching function thereby permitting the use of a current pulse 15 of a lesser magnitude. The inductance of the solenoid 13 is thus also substantially reduced since the space *e* may be held to a minimum. The mode of operation depicted in FIG. 2A is advantageously applicable to variable store memory arrangements in which binary information is stored as stable remanent states of the address segments 14 themselves. Thus, any flux switching in the wire memory element 11 is enhanced regardless of the manner in which the wire memory element 11 is operated.

Figure 1A:
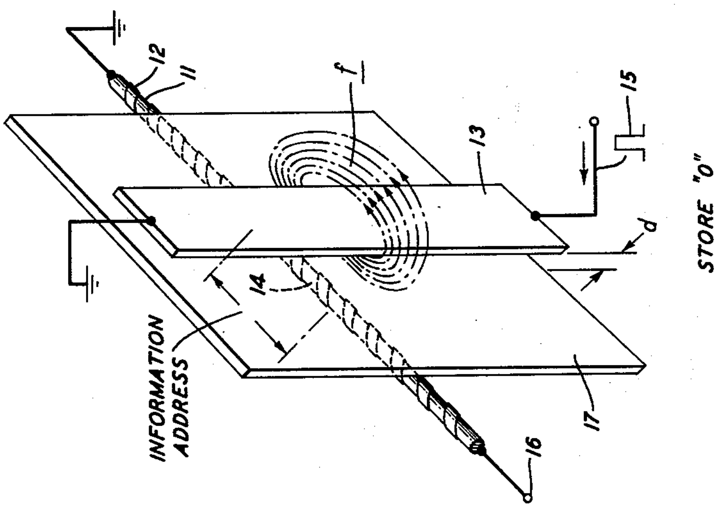

The shielding arrangement depicted in FIG. 2A is also advantageously applicable to a memory circuit in which the stored information is carried in the form of selectively spaced apertures in the sheet 17 in a manner similar to that described in connection with the embodiment of FIGS. 1A and 1B. This manner of operation may be understood by reference to FIG. 2B in which a fragmented portion of the conductive sheet 17 is shown placed in a relationship with the wire memory element 11 and solenoid 13 as was described in connection with the same embodiment of FIG. 2A. The sheet 17 is provided with an aperture 18 adjacent the information address segment 14 of the element 11. When a current pulse 15 is applied to the solenoid 13 the field generated is now no longer concentrated in the address segment 14. The aperture 18 permits the generated field to follow its normal distribution which will be through the latter aperture as depicted by the lines of force *f'* in FIG. 2B. As a result, the applied field will now be insufficient to cause a flux switching, should the polarity of any remanent flux in the address segment 14 permit. A positive discrimination is thus also achieved between a flux switching and a no flux switching of the information address segment 14. By selectively providing apertures 18 adjacent particular address segments 14 of a wire memory element 11 remanently flux saturated in one direction, any sequence of binary information values may be stored. It should be noted in connection with this mode of operation that a binary "1," that is, the information value the storage of which is to be manifested by an output signal on the terminal 16 during the time of the interrogating current pulse 15, is stored as a solid portion of the sheet 17 adjacent an address segment 14. A binary "0" in this case is stored as an aperture 18 adjacent an address segment 14. This is thus the converse of the aperture-no aperture representations of the embodiment of FIGS. 1A and 1B. In this mode of operation the energizing current pulse 15 may again be adjusted so that a flux switching is just achieved by the field concentrated by the conductive sheet 17 to insure maximum discrimination and the greatest saving in power requirements.

Figures 3, 5A, 5B, 6A, 6B:
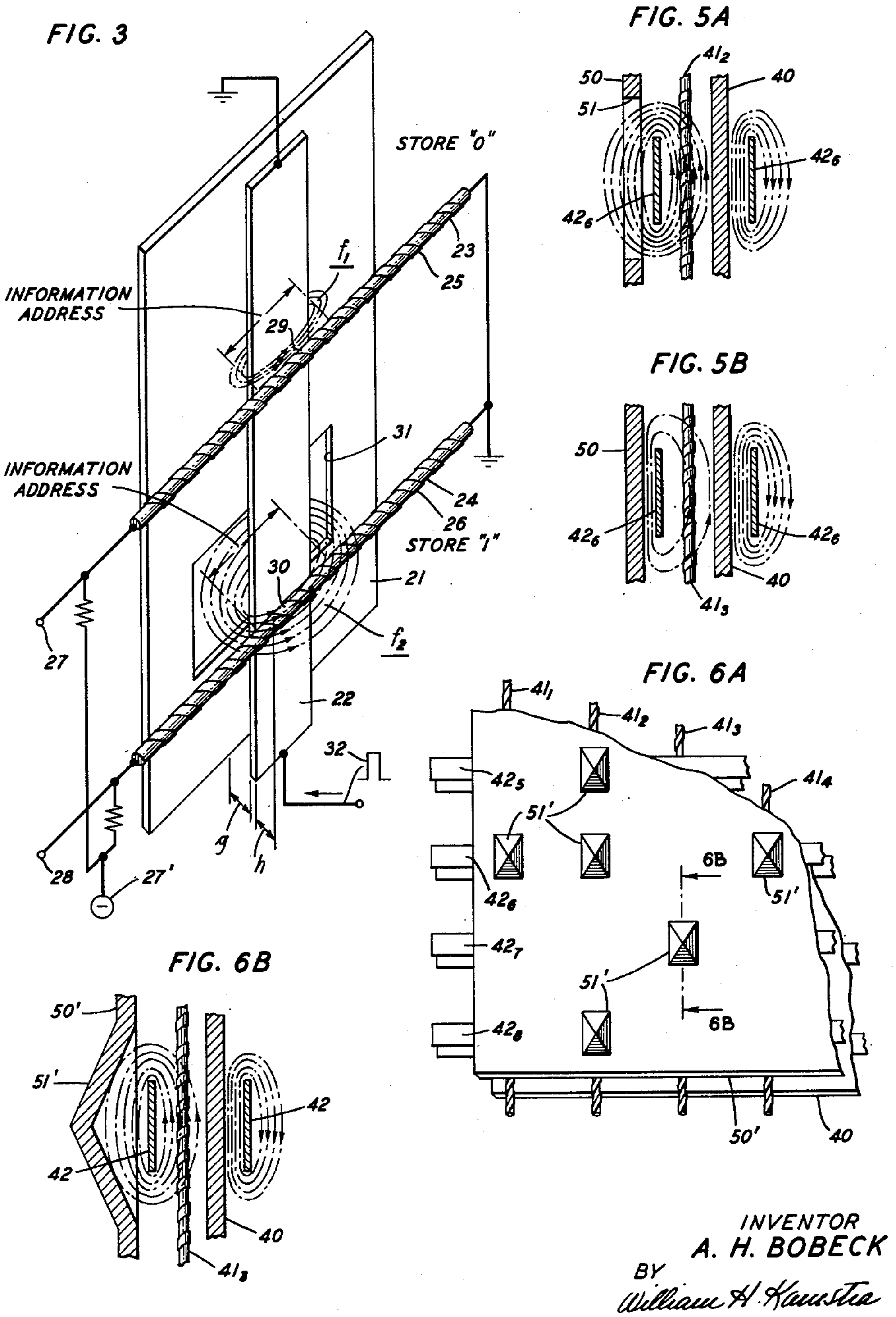
FIG. 3 is a perspective view of a two address memory arrangement providing for magnetic shielding in a third mode of operation according to the principles of this invention.
FIGS. 5A and 5B are cross-sectional views of the memory array assembly of FIG. 4 taken along the lines 5A and 5B, respectively.
FIG. 6A depicts a fragmentary portion of the memory array of FIG. 4 having a conductive sheet having indentations therein as information representations rather than apertures.
FIG. 6B is a cross-sectional view of the memory array assembly portion of FIG. 6A taken along the line 6B.

In FIG. 3 is shown another specific embodiment of the present invention operating in a third mode. In this embodiment an electrically conductive sheet 21 is positioned on the opposite side of an energizing solenoid 22 from a first and a second wire memory element 23 and 24. The wire elements 23 and 24 have helically associated therewith magnetizable tape components 25 and 26 and terminate in terminals 27 and 28, respectively. The solenoid 22 defines on the wire memory elements 23 and 24 information addresses which occupy the element segments 29 and 30, respectively. The sheet 21 has provided therein adjacent the wire memory element segment 30 an aperture 31. The embodiment of FIG. 3 is advantageously applicable as a permanent information store in which the information values are carried as aperture-no aperture representations in the sheet 21. In such a store the wire memory elements 23 and 24 have their magnetizable components 25 and 26 remanently flux saturated in one direction. This may be accomplished by known magnetic biasing means such as potential source 27'. During an interrogating phase of operation a current pulse 32 of suitable polarity is applied to the solenoid 22 and, as a result, a magnetic field is generated which is operative on the wire memory element segments 29 and 30. The spacing $g$ however, of the sheet 21 and the solenoid 22 with respect to the spacing $h$ of the solenoid 22 and the wire memory elements 23 and 24 is such that the field will operate differently at the address segments 29 and 30. At the address segment 29, which has opposite the solenoid 22 therefrom a solid portion of the sheet 21, the field will be constrained and limited by the eddy current shielding effect of the sheet 21 as referred to in connection with the embodiment of FIG. 1A. Since fewer lines of force $f_1$ can find closure paths around the solenoid 22 a smaller field will be available to cause any flux switching in the address segment 29. No appreciable switching results in the latter segment as a consequence, with the absence of an output signal on the terminal 27 being indicative that the sheet 21 stores a binary "0" opposite the address segment 29 of the wire memory element 23. The field generated by the solenoid 22 and represented by the lines of force $f_2$, during the applied interrogating pulse 32 is not so inhibited with respect to the address segment 30 of the memory element 24, however. Since the sheet 21 is apertured at this point no shielding effect takes place and the field is sufficient to cause a flux switching in the address segment 30 of the wire memory element 24. The resulting output signal appearing on the terminal 28 will be indicative of the storage in sheet 21 by the aperture 31 of a binary "1." The aperture-no aperture representations of the embodiment of FIG. 3 thus accord with the same representations in the embodiment of FIGS. 1A and 1B. The magnitude of the current pulse 32 is again adjusted to achieve the greatest discrimination between the fields at the aperture-no aperture points and to minimize power requirements.

Figure 4:
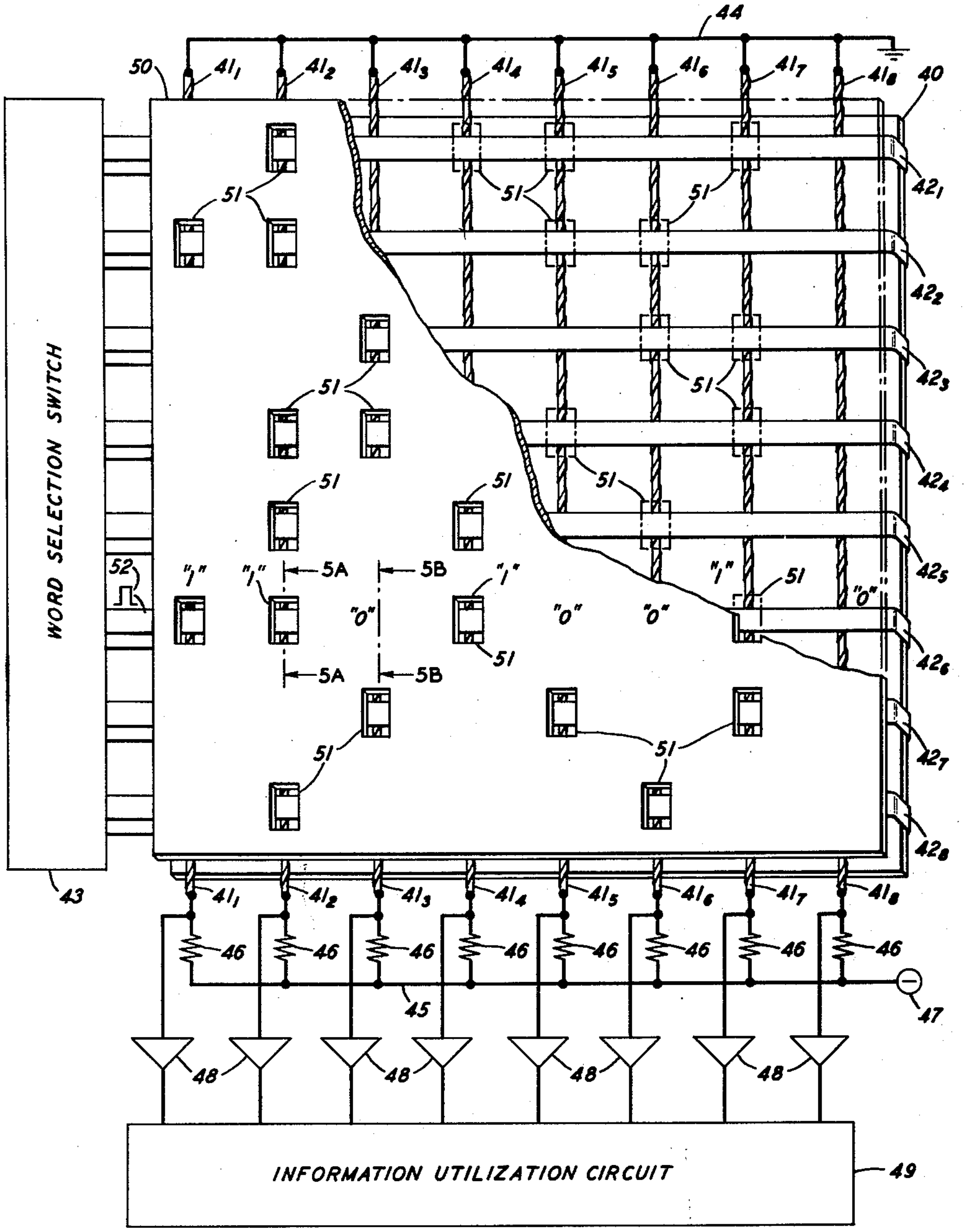
FIG. 4 depicts a permanent magnetic memory array combining particular modes of operation according to this invention having a portion of the apertured conductive sheet broken away to show the details of the memory assembly.

The foregoing basic modes of operation according to the principles of this invention are intended to be illustrative only and are not to be understood as exhausting or otherwise limiting the various modes and combinations of modes of operation possible in the practice of this invention. Thus, for example, particular modes of operation may be combined to achieve a highly advantageous permanent magnetic memory array. An illustrative embodiment of such an array is depicted in FIG. 4 and comprises an electrically conductive sheet 40 which sheet 40 is a permanent part of the memory array assembly. A plurality of magnetic wire memory elements $41_1$ through $41_8$ are arranged substantially in parallel and in a plane substantially parallel to the plane of the sheet 40 to constitute the Y coordinates of the coordinate array. Next in order from the sheet 40 is arranged a plurality of strip solenoids $42_1$ through $42_8$ arranged substantially in parallel and transversely to the wire memory elements 41. The strip solenoids 42 are also in a plane substantially parallel to the plane of the sheet 40 and constitute the X coordinates of the coordinate array. The strip solenoids 42 thus define a coordinate array of information addresses at the segments of the wire memory elements 41 to which they are also inductively coupled. The solenoids 42 are connected at one end to a word selection switch 43 and, after passing over the memory elements 41, return to the switch 43 on the far side of the sheet 40 as viewed in FIG. 4 The solenoids 42 are not in direct electrical contract with wire memory elements 41 nor with the sheet 40 as will become apparent hereinafter.

The wire memory elements 41 are electrical conductors and, in this illustrative embodiment being described, have associated therewith helical magnetizable components which may advantageously have substantially rectangular hysteresis characteristics as mentioned previously herein. The latter components are not specifically designated and are shown only symbolically in the drawing. The wire memory elements 41 are each connected at one end to a ground bus 44 and at the other end to a bus 45 through a load resistor 46. The bus is connected to a source of negative potential 47. The wire memory elements 41 are each also connected through an amplifying means 48 to information utilization circuits 49. A second electrically conductive sheet 50 is positioned directly above the paralleled solenoids 42 as viewed in the drawing and is shown partially broken away to expose the relationship of the elements making up the memory stack. In recapitulation, the order of structural elements making up the memory stack comprises, reading from the top down: conductive sheet 50, solenoids 42, wire memory elements 41, conductive sheet 40, and the returns of the solenoids 42.

The illustrative memory array of FIG. 4 is word organized, the individual information values of a particular word being stored in information addresses which are defined on the memory elements 41 by a solenoid 42. Corresponding information values of the words are stored in information addresses of the same wire memory element 41. Information is stored in the memory array in the form of a particular pattern of apertures 51 provided in the sheet 50. The apertures 51 are located to correspond, wherever they occur, with the information addresses of the coordinate array. In this specific embodiment an aperture of the sheet 50, as will become apparent from a description of an illustrative readout operation hereinafter, is held representative of a binary "1" and a solid portion of the sheet 50 at an information address is held representative of a binary "0". The memory array of FIG. 4 is shown for purposes of description as an 8 x 8 array. Obviously, the principles of this invention and its organization apply equally well to memory arrays of any size. Similarly although only a single plane memory array is shown the scope of this invention is also to be understood as including multi-plane memory arrays. The amplifying means 48 may comprise any such circuit known to one skilled in the art capable of raising signals generated during the readout of the memory to levels suitable for transmission to the information utilization circuits 49. The latter circuits may also comprise any well-known information handling circuits capable of accepting signals conventionally indicative of the two binary values. The word selection switch 43 may comprise a toroidal core drive circuit capable of selectively applying an interrogating current pulse to the solenoids 42 under the control of associated circuitry of the system of which the memory array of FIG. 4 may comprise a part. Since the circuits 43, 48, and 49 will be known to, and are readily devisable by, one skilled in the art they need not be described in detail at this point.

The magnetizable components of the wire memory elements 41 are normally maintained in one state of remanent magnetization by the continuously applied potential supplied by the battery 47. For purposes of describing a representative readout operation of the present memory array it will be assumed that an interrogating current pulse 52 is applied by the switch 43 to the solenoid $42_6$. As is now evident from the drawing, the latter solenoid defines an information word comprising the illustrative binary values 1, 1, 0, 1, 0, 0, 1, 0. The current pulse 52 is of a polarity such that the field generated by the solenoid $42_6$ tends to reverse the flux induced by the battery 47 in each of the wire memory elements $41_1$ through $41_8$ at the information addresses defined by the solenoid $42_6$. The action of the switching field may be better understood by reference to FIGS. 5A and 5B which show enlarged cross sections taken through the memory array along the solenoid $42_6$ at an aperture 51 and at a solid portion of the sheet 50, respectively. Wherever an aperture 51 occurs, it is clear that the full effect of the field generated by the solenoid $42_6$ may act on the address segment of a memory element 41. Accordingly, at these points a full flux switching occurs and resulting potential differences appearing between the ends of the memory elements 41 in question cause output signals to be applied to the connected amplifying means 48. These signals will be generated at the ends of the wire memory elements $41_1$, $41_2$, $41_4$, and $41_7$ as indicative of the binary "1's" of the information word being interrogated and stored as apertures in the sheet 50. The output signals will be transmitted to the utilization circuits 49.

Where a solid portion of the sheet 50 occurs opposite an information address the eddy current shielding effect of the conductive sheet 50 constrains and limits the field generated by the solenoid 42. As a result insufficient field is available to cause a flux switching against the bias of the battery 47. The absence of appreciable output signals induced in the wire memory elements $41_3$, $41_5$, $41_6$, and $41_8$ is thus conventionally indicative of the presence of binary "0's" in the memory array. In either the apertured or non-apertured case of the conductive sheet 50, the non-apertured sheet 40 effectively shields the information address segments of the wire memory elements 41 from fields produced by the returns of the solenoids 42 during the interrogating pulses. In addition, the non-apertured sheet 40 also provides a constraining effect for fields generated at the apertures of the sheet 50 thereby acting to guide the latter fields along the information address segments. The fields in each of the cases above described are ideally depicted in FIGS. 5A and 5B and the eddy current shielding effects are there demonstrated.

The illustrative memory array of FIG. 4 is shown only in a simplified form. Thus, although the information carrying sheet 50 is shown merely as placed in coordinate association with the rest of the elements making up the memory stack in the practice of this invention the sheet 50 is advantageously held by mechanical guiding arrangements, not shown, readily devisable by one skilled in the art. The sheet 50 is thus easily exchangeable for a similar sheet carrying another and different pattern of information representative apertures. The non-apertured sheet 40, in addition to providing the shielding effects described in the foregoing, also advantageously provides a mounting board on which the solenoids and wire memory elements may be held during fabrication. A mechanically simple and easily fabricated memory array is thus presented in accordance with the present invention and one which is particularly tolerant in the physical alignment of apertured information carrying sheets and the coordinate array of memory elements.

The principles of this invention lend themselves to a wide variation in the physical dimensions of the component elements of a memory array such as that of FIG. 4. In one specific assembly it was found that copper sheets having a thickness of approximately 0.006 inch were suitable as the conductive sheets 40 and 50. A spacing of 0.100 inch between the wire memory elements 41 made possible the limiting of the dimensions of the apertures 51 to approximately 0.070 by 0.030 inch. The width of the solenoids 42 was held to approximately 0.050 inch allowing another 0.050 between adjacent solenoids. The magnitude of the interrogating drive current pulse 52 is adjusted to obtain the maximum discrimination between the fields operative on the information address segments of the wire memory elements 41 at the aperture-no aperture points of the sheet 50.

The conductive sheet 50 of the illustrative memory array of FIG. 4 carries the stored information therein as a pattern of apertures 51. Another manner in which the same information may be carried in a similar conductive sheet and for the same purpose is shown in FIG. 6A. A fragment of the memory array assembly of FIG. 4 comprising the lower left hand corner as viewed in the drawing is present in FIG. 6A. Only portions of the wire memory elements $41_1$, $41_2$, $41_3$, and $41_4$ are visible as are portions of the solenoids $42_5$, $42_6$, $42_7$, and $42_8$. The conductive sheet 40 is again arranged between the wire memory elements 41 and the returns of the solenoids 42. The information carrying means in this case is an electrically conductive sheet 50' in which the information is stored in a pattern of indentations or displacements 51' thereon. The indentations serve the same purpose as the apertures 51 of the sheet 50 of the embodiment of FIG. 4, each indentation 51' being representative of a stored binary "1" in the sheet 50'. A cross section taken at any of the indentations 51' of the embodiment of FIG. 6 will demonstrate the identity of operation with the coresponding apertured arrangement shown in cross section in FIG. 5A. Such a cross-sectional view of an indentation 51' portion of the fragmentary view of FIG. 6A is shown in FIG. 6B. Clearly an indentation 51' permits the full effect of a field generated by a solenoid 42 during an interrogating pulse to be applied to an address segment of a wire memory element 41 as does an aperture 51 in the embodiment of FIG. 4. At the coordinate information addresses of the memory array where no indentation 51' of the sheet 50' occurs, that is, where a binary "0" is stored the shielding operation of the sheet 50' is identical to that described in connection with the sheet 50 of the embodiment of FIG. 4. An indented conductive sheet 50' provides the advantage of preventing eddy current path interactions thus making possible a higher information bit density in the memory array.

In the foregoing, highly advantageous illustrative magnetic memory arrays have been described in which binary information may be permanently stored in the form of apertures or indentations in electrically conductive sheets. The information is read nondestructively since the only way that the information may be removed from the memory is to remove or replace the information bearing sheet. The information sheets may be made readily interchangeable and are easily produced by known punched or pressed information card techniques. In each of the figures of the drawing the dimensions of the component elements of the embodiments there depicted and the relationship of those elements have been exaggerated to facilitate an understanding of the principles of this invention and the manner of its practice.

Further, it is to be understood that what have been described are considered to be only illustrative embodiments of the present invention and various and numerous other arrangements may be devised by one skilled in the art without departing from the spirit and scope of this invention.

What is claimed is:

1. A memory circuit comprising a wire memory element capable of having a magnetic flux switched therein, an energizing winding coupled to said memory element and defining on a limited portion thereof an information address, means for applying an energizing pulse to said winding to generate a magnetic field acting on said memory element at said information address, an electrically conductive sheet positioned in inductive relationship with said field for controlling flux switching in said memory element at said information address, and means for sensing flux switching in said memory element.

2. A memory circuit comprising a wire memory element capable of having a magnetic flux switched therein, energizing windings coupled to said memory element and defining information address segments thereon, means for applying energizing pulses to said windings to generate magnetic fields acting to cause a flux switching at said information address segments, an electrically conductive sheet positioned between said memory element and said windings for shielding said fields from particulat ones of said information address segments, and means for sensing flux switching in said memory elements.

3. A memory circuit as claimed in claim 2 in which said conductive sheet has apertures therein for permitting access to said fields at others of said information address segments to permit a flux switching at said last-mentioned address segments.

4. A memory circuit comprising a wire memory element capable of having a magnetic flux switched therein, an inductive winding means coupled to one side of said wire memory element and defining an information address thereon, means for applying an energizing pulse to said winding means to generate a magnetic field at said information address, an electrically conductive sheet positioned on the other side of said wire memory element for constraining said field to cause a flux switching in said memory element at said information address, and means for sensing flux switching in said memory element.

5. A memory circuit comprising a wire memory element capable of having a magnetic flux switched therein, a plurality of inductive winding means coupled to one side of said wire element and defining a plurality of information addresses thereon, means for applying energizing pulses to said plurality of winding means to generate magnetic fields at said information addresses, an electrically conductive sheet positioned on the other side of said wire memory element for constraining said fields at particular ones of said information addresses to cause flux switching in said wire memory element at said last-mentioned addresses, and means for sensing flux switching in said memory element at each of said plurality of information addresses.

6. A memory circuit as claimed in claim 5 in which said conductive sheet has apertures therein at others of said information addresses for dispersing said fields and preventing flux switching in said wire memory element at said last-mentioned addresses.

7. A memory circuit comprising a wire memory element capable of having a magnetic flux switched therein, a plurality of inductive winding means coupled on one side to said wire memory element an defining a plurality of information addresses thereon, means for applying energizing pulses to said winding means to generate magnetic fields at said information addresses, an electrically conductive sheet positioned on the other side of said plurality of winding means for limiting said fields and prevent flux switching in said wire memory element at particular ones of said information addresses, said conductive sheet being apertured at others of said information addresses for permitting said fields to cause a flux switching in said wire memory element at said last-mentioned addresses, and means for sensing flux switching in said memory element at each of said plurality of information addresses.

8. A memory circuit comprising a wire memory element capable of having a magnetic flux switched therein, a plurality of energizing windings coupled to said memory element and defining a plurality of information addresses thereon, means for applying energizing pulses to said windings to generate magnetic fields acting on said memory element at said information addresses, an electrically conductive apertured sheet positioned in inductive relationship with said fields, said sheet having solid portions thereof at first addresses of said plurality of information addresses and apertures therein at second addresses of said plurality of information addresses for controlling flux switching in said memory element at said first and second addresses, and means for sensing flux switching in said memory element at said first and second information addresses.

9. An information storage circuit comprising a plurality of wire memory elements each having a helical magnetic component capable of having a magnetic flux switched therein, an energizing winding serially coupled to said memory elements and defining information addresses thereon, means for applying an energizing pulse to said winding to generate magnetic fields acting to cause a flux switching in one direction at said information addresses, an electrically conductive apertured sheet positioned between said memory elements and said winding, said sheet having solid portions thereof shielding said fields from particular information addresses representative of one binary information value and having apertures therein for permitting access to said fields at others of said information addresses representative of another binary information value, and means for sensing flux switching in said memory elements indicative of said other information value.

10. An information storage circuit as claimed in claim 9 also comprising means for magnetically biasing each of said memory elements in the other direction at each of said information addresses.

11. An information storage circuit comprising a plurality of wire memory elements each having a helical magnetic component, means for inducing a magnetic flux of one polarity in each of said magnetic components, an inductive winding means coupled to one side of said wire memory elements and defining a plurality of information addresses on said elements, means for applying an energizing pulse to said winding means to generate magnetic fields of the other polarity at said information addresses, an electrically conductive sheet positioned on the other side of said wire memory elements, said sheet having solid portions thereof for constraining said fields at particular information addresses to cause a flux switching in said magnetic components at said particular addresses representative of one binary information value and having apertures therein at other information addresses for dispersing said fields and preventing flux switching in said magnetic components at other information addresses representative of another binary information value, and means for sensing flux switching in said magnetic components indicative of said other binary information value.

12. An information storage circuit comprising a plurality of wire memory elements each having a helical magnetic component, means for inducing a magnetic flux of one polarity in each of said magnetic components, an inductive winding means coupled on one side to said wire memory elements and defining a plurality of information addresses thereon, means for applying an energizing pulse to said winding means to generate magnetic fields of the other polarity at said information addresses, an electrically conductive sheet positioned on the other side of said inductive winding means, said sheet having solid portions thereof at particular information addresses for limiting said fields and preventing flux switching in said magnetic components at said last-mentioned addresses representative of one binary information value, said sheet having apertures therein at others of said information addresses for permitting said fields to cause flux switching in said magnetic components at said last-mentioned addresses representative of another binary information value, and means for sensing flux switching in said magnetic components at said last-mentioned information addresses indicative of said other binary information value.

13. An information storage circuit as claimed in claim 12 in which said inductive winding means comprises a flat strip solenoid passing between said conductive sheet and said plurality of wire memory elements.

14. In an information storage assembly, a plurality of wire memory elements each having a helical magnetic component, a strip solenoid means passing in inductive coupling in one direction on one side of said plurality of wire memory elements and returning in the other direction on the other side of said plurality of wire memory elements and defining a plurality of information addresses on said wire memory elements, a first electrically conductive sheet positioned between said solenoid means returning in the other direction and one side of said plurality of wire memory elements, means for applying an energizing pulse to said solenoid means to generate magnetic fields at said information addresses, a second electrically conductive sheet positioned on the outer side of said solenoid means passing in said one direction, said second conductive sheet having solid portions thereof at particular information addresses for limiting said fields and preventing flux switching in said magnetic components at said last-mentioned addresses representative of one binary information value, said second conductive sheet having apertures therein at others of said information addresses for permitting said fields to cause flux switching in said magnetic components at said last-mentioned addresses representative of another binary information value, and means for sensing flux switching in said magnetic components at said last-mentioned information addresses indicative of said other binary information value.

15. A memory circuit comprising a wire memory element capable of having a magnetic flux switched therein, a plurality of energizing winding means coupled to said memory elements and defining a plurality of information addresses thereon, means for applying energizing pulses to said winding means to generate magnetic fields acting on said memory elements at said information addresses, an electrically conductive sheet positioned in inductive relationship with said fields, said sheet having solid flat portions thereof at particular ones of said information addresses and said sheet being displaced at others of said information addresses for controlling flux switching in said memory element at said particular ones and said others of said information addresses, and means for sensing flux switching in said memory element.

16. A memory circuit as claimed in claim 15 in which said electrically conductive sheet is displaced at said others of said information addresses by means of apertures therein.

17. A memory circuit as claimed in claim 15 in which said electrically conductive sheet is displaced at said others of said information addresses by means of indentations therein.

18. A magnetic information storage array comprising a plurality of wire memory elements lying on first coordinates of said array, each of said memory elements having a magnetizable component capable of having a magnetic flux switched therein, a plurality of energizing winding means coupled on one side to said plurality of wire memory elements, said plurality of energizing winding means defining a plurality of corresponding information addresses on said wire memory elements lying on second coordinates of said array, means including a source of current pulses for selectively energizing one of said plurality of winding means to generate magnetic fields at the information addresses of a particular second coordinate, an electrically conductive sheet positioned on the other side of said plurality of energizing winding means, said first conductive sheet having solid flat portions thereof at particular ones of said information addresses of said particular second coordinate for limiting said fields to prevent flux switching in the wire memory elements at said last-mentioned information addresses representative of one binary information value, said first conductive sheet being displaced at others of said information addresses of said second coordinate to permit said fields to cause a flux switching in said wire memory elements at said last-mentioned others of said information addresses representative of another information value, and means for sensing voltage signals generated across the ends of said wire memory elements indicative of said other binary information values.

19. A magnetic information storage array as claimed in claim 18 in which said electrically conductive sheet is displaced at said others of said information addresses by means of apertures therein.

20. A magnetic information storage array as claimed in claim 18 in which said electrically conductive sheet is displaced at said others of said information addresses by means of indentations therein.

21. A magnetic information storage array as claimed in claim 19 also comprising means for magnetically biasing each of said plurality of wire memory elements in a direction opposite to that of said magnetic fields.

22. A magnetic information storage array as claimed in claim 21 in which each of said plurality of energizing windings means comprises a strip solenoid means having a portion thereof passing in one direction between said conductive sheet and one side of said plurality of wire memory elements and another portion thereof returning in the other direction on the other side of said plurality of wire memory elements.

23. A magnetic information storage array as claimed in claim 22 also comprising a second electrically conductive sheet positioned between the other side of said plurality of wire memory elements and said other portion of said strip solenoid means.

24. An information storage arrangement comprising an electrically conductive sheet presenting a coordinate array of plane and displaced areas representative of stored information bits, and means for reading out a group of said information bits comprising a plurality of wire memory elements defining first coordinates of said array capable of having a magnetic flux switched therein, a winding means inductively coupled to each of said wire memory elements and to said conductive sheet and defining a second coordinate of said array, means for applying a current pulse to said winding means for generating magnetic fields for causing flux switching in said wire memory elements as controlled by said plane and said displaced areas of said sheet, and means for sensing voltage signals induced across the ends of said wire memory elements responsive to said flux switching.

25. An information storage arrangement comprising an electrically conductive sheet having information stored therein in the form of a particular pattern of apertures therein, each of said apertures corresponding to an information address of a coordinate array of information addresses, and means for reading out said information comprising a plurality of magnetic wire memory elements capable of having magnetic flux switched therein, a plurality of winding means inductively coupled to said plurality of wire memory elements and to said conductive sheet and defining a plurality of address segments on said wire memory elements also corresponding to said coordinate array of information addresses, means for selectively applying current pulses to said plurality of winding means to generate magnetic fields acting at said information addresses, said sheet preventing flux switching at solid portions thereof at particular ones of said address segments and permitting flux switching at apertures therein at others of said address segments, and sensing means for detecting flux switching in said wire memory elements indicative of said stored information.

26. A memory device comprising an electrically conductive sheet having a solid portion at a first point and an aperture therein at a second point, and means for differentiating between said points on said sheet comprising a first and a second magnetic wire memory element capable of having magnetic flux switched therein associated with said sheet at said first and said second points, respectively, a winding means inductively coupled to said first and said second wire memory elements and to said conductive sheet, means for applying a current pulse to said winding means for generating magnetic fields at said first and said second points on said sheet, said solid portion and said aperture of said sheet controlling the effect of said fields to cause flux switching in said first and said second wire memory elements, and sensing means for detecting flux switching in said first and said second wire memory elements.

27. A memory device comprising a first and a second magnetic wire memory element each being capable of having magnetic flux switched therein, a winding means inductively coupled to said wire memory elements and defining a first and a second information address thereon, means for applying a current pulse to said winding means for generating magnetic fields at said first and said second information address, an electrically conductive sheet having a solid flat portion and a displaced portion thereon so positioned with respect to said first and said second wire memory element and said winding means such that said solid portion and displaced portion differently control said magnetic fields to cause flux switching at one of said information addresses, and means for sensing voltage signals induced in said wire memory elements by flux switching therein.

References Cited in the file of this patent

UNITED STATES PATENTS

| | | |
|---|---|---|
| 2,740,110 | Trimble | Mar. 7, 1956 |
| 2,769,873 | Novegard | Nov. 6, 1956 |
| 2,820,216 | Grottrup | Jan. 14, 1958 |

FOREIGN PATENTS

| | | |
|---|---|---|
| 1,105,870 | France | July 13, 1955 |

OTHER REFERENCES

"Nondestructive Sensing of Magnetic Cores," by Dudley A. Buck and Werner I. Frank, pp. 822 to 830, "Communications and Electronics," January 1954.